United States Patent [19]

Sato

[11] 4,285,011
[45] Aug. 18, 1981

[54] APPARATUS FOR PRODUCING AN IMAGE OF AN OBJECT SCANNED BY ULTRASONIC WAVE BEAMS

[75] Inventor: Ichiro Sato, Kawasaki, Japan

[73] Assignee: Tokyo Shibaura Denki Kabushiki Kaisha, Japan

[21] Appl. No.: 5,871

[22] Filed: Jan. 23, 1979

[30] Foreign Application Priority Data

Jan. 23, 1978 [JP] Japan .................................... 53-6048

[51] Int. Cl.³ ............................................. H04N 7/18
[52] U.S. Cl. ....................................... 358/112; 73/626
[58] Field of Search .................. 358/112; 73/625, 626; 128/660

[56] References Cited

U.S. PATENT DOCUMENTS

| | | | |
|---|---|---|---|
| 4,080,838 | 3/1978 | Kuroda | 73/626 |
| 4,099,419 | 7/1978 | Kuroda | 73/626 |
| 4,145,680 | 3/1979 | Smith | 73/626 |

*Primary Examiner*—Howard W. Britton
*Attorney, Agent, or Firm*—Finnegan, Henderson, Farabow, Garrett & Dunner

[57] ABSTRACT

Delay controllers are provided to delay pulses supplied to a plurality of electro-acoustic transducers.

Each controller comprises a delay line provided with a plurality of taps and a switch for selectively changing the taps. There are further provided a measuring circuit for measuring amounts of delay time defined by the respective taps of the delay controllers; a CPU for controlling the operation of the measuring circuit and delay controllers. The CPU causes the measuring circuit to measure the amounts of delay time defined by the respective taps. Where the electro-acoustic transducers are electrically operated in accordance with the result of measurement, data for selecting any of the taps is stored in the RAM after proper compensation.

4 Claims, 9 Drawing Figures

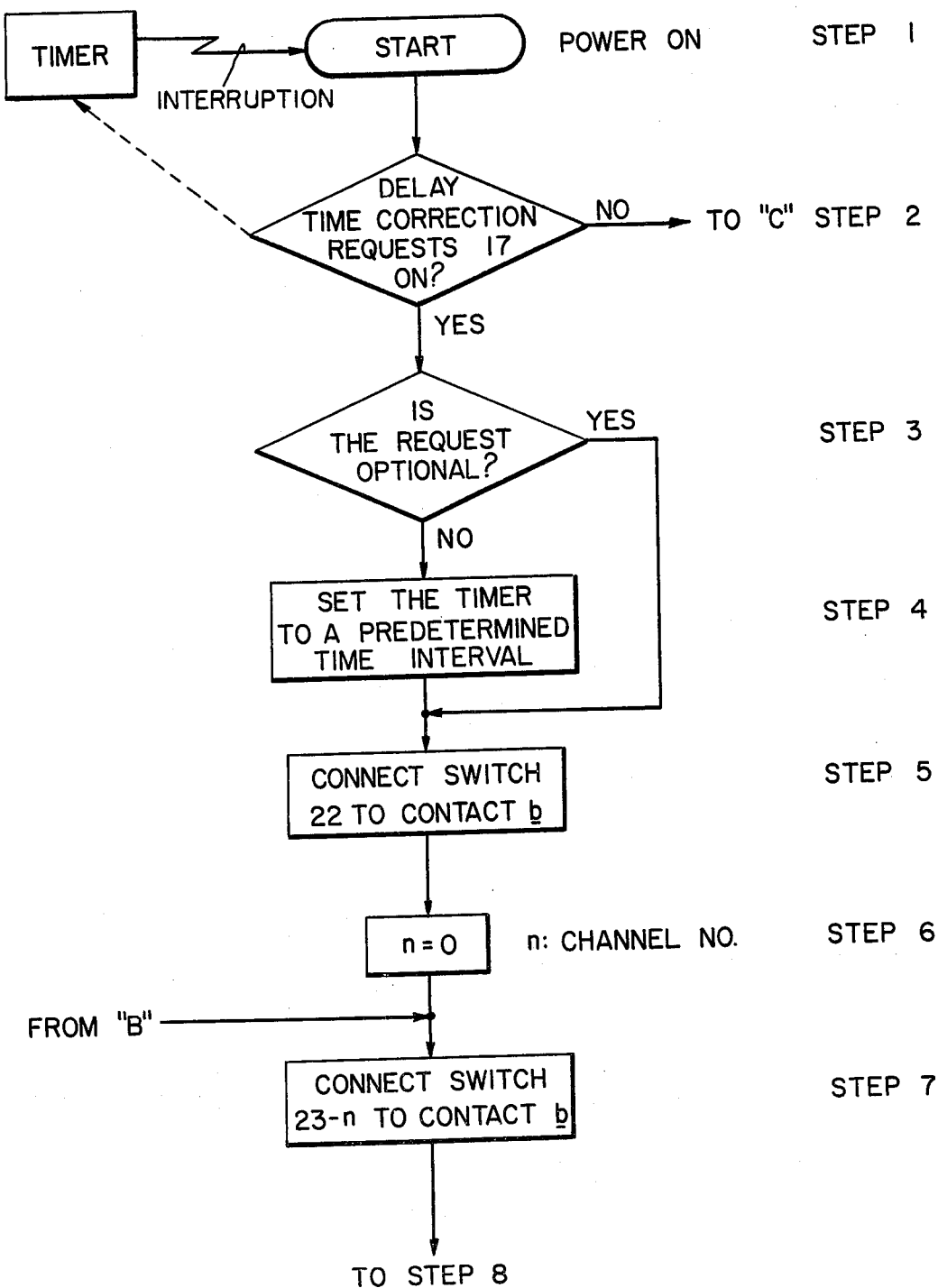

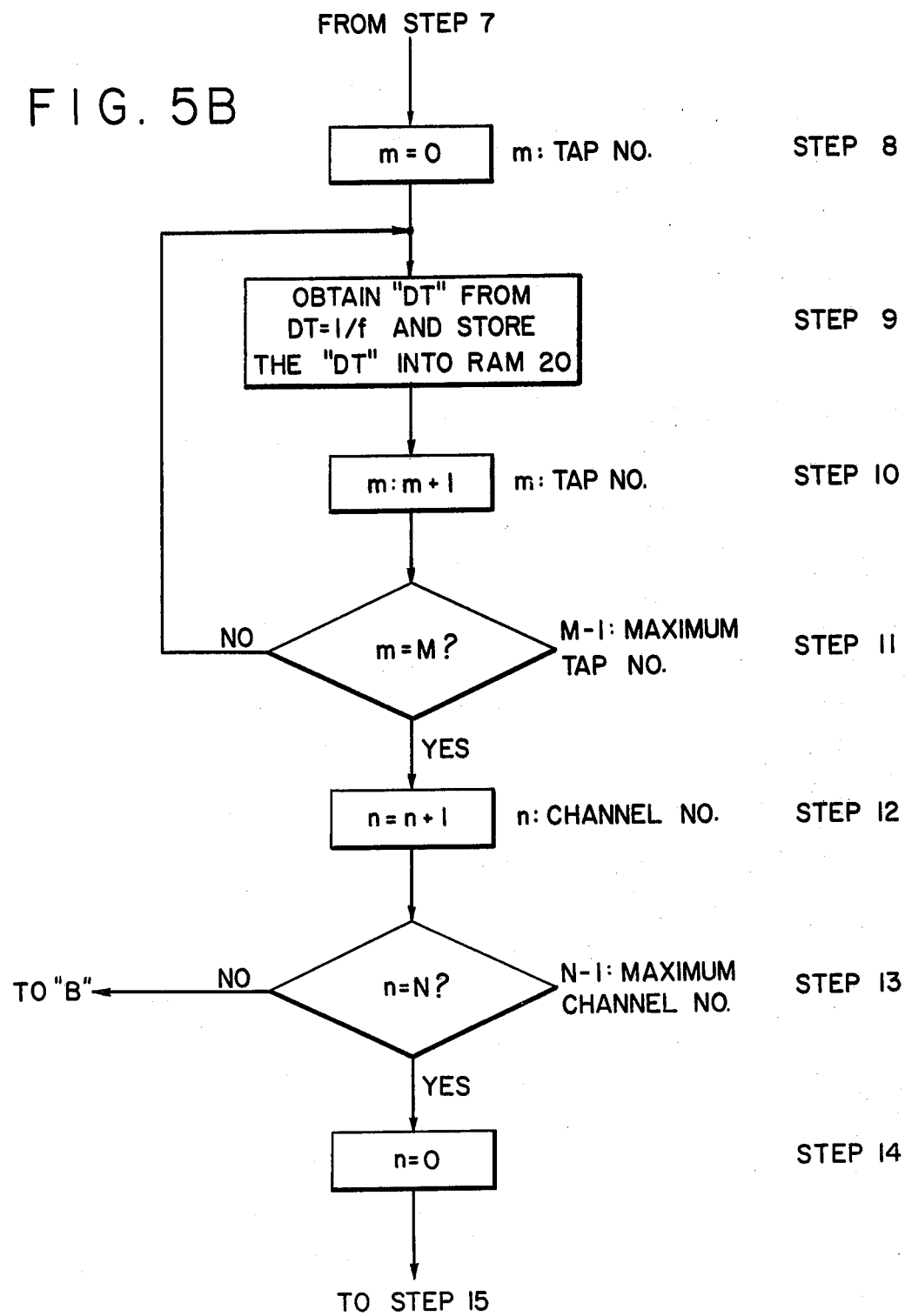

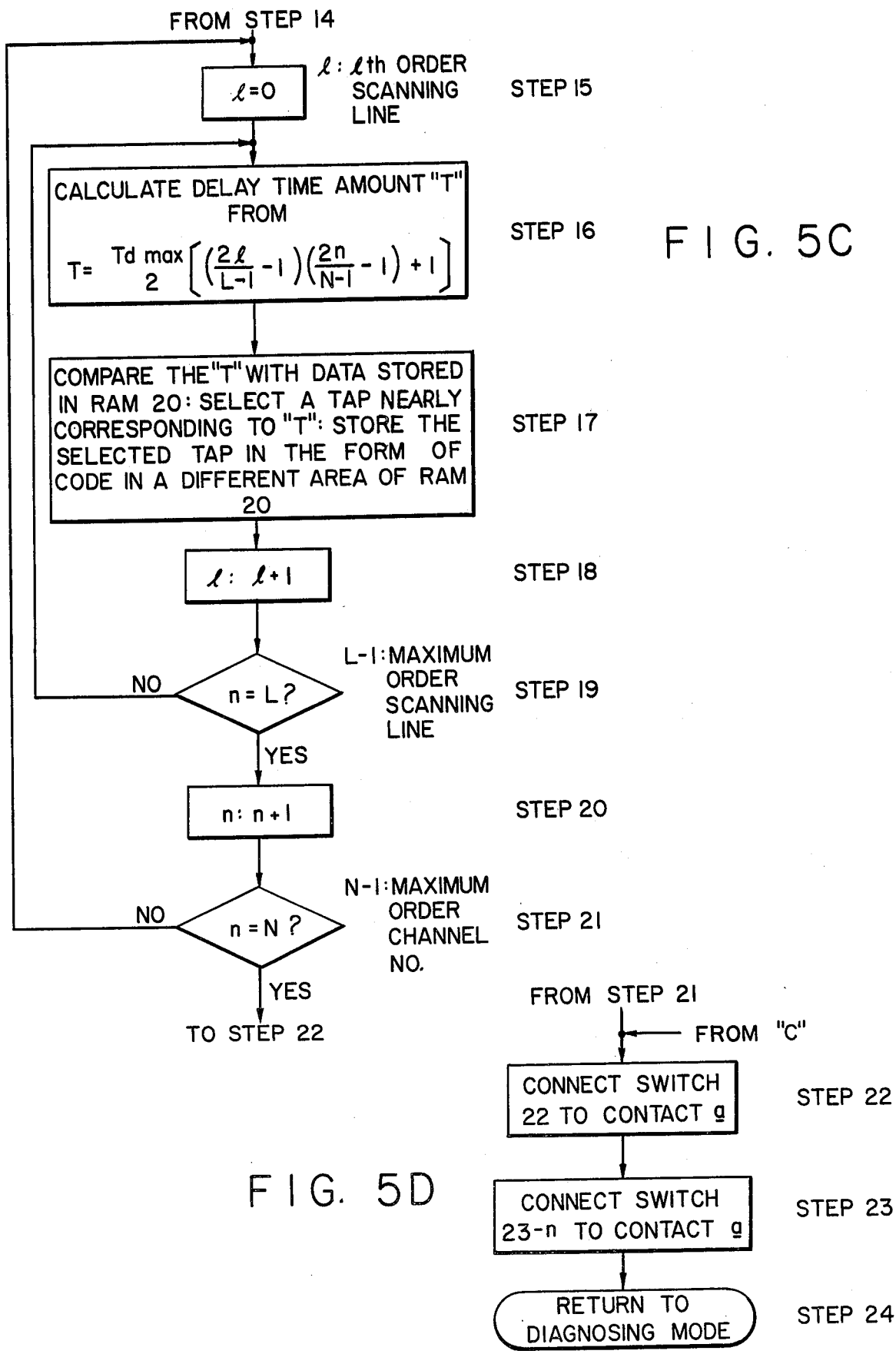

APPARATUS FOR PRODUCING AN IMAGE OF AN OBJECT SCANNED BY ULTRASONIC WAVE BEAMS

This invention relates to an apparatus for producing an image of an object scanned by ultrasonic wave beams, more particularly to an ultrasonic diagnosing apparatus of the electronic scanning type.

This type of imaging apparatus comprises a plurality of electro-acoustic transducers (hereinafter referred to as "transducers") arranged in a prescribed pattern. Where these transducers are supplied with pulses of different delay times which are produced by delaying output signals from a reference signal generator, then ultrasonic wave beams are radiated in a predetermined direction relative to a reference line. It is possible to irradiate ultrasonic wave beams in another direction by changing the delay time. Where the delay times at which pulses are sent forth are changed electronically, then an object under examination can be scanned by ultrasonic wave beams. Ultrasonic wave beams reflected from the object under examination are provided to the transducers, which convert the ultrasonic wave beams into video signals. The video signals are delayed in accordance with the delay times, and, after processed in a prescribed manner, are displayed as an image of the object.

For better understanding of this invention, there will now be described by reference to FIG. 1 the conventional ultrasonic diagnosing apparatus. This apparatus comprises a reference signal generator 1 which sends forth system synchronization signals and also drive pulses to cause the transducers 8-0 to 8-(N-1) to issue ultrasonic wave beams. The system synchronization signals are counted by a counter 2 and the output of the counter is supplied to a programable read only memory (PROM; hereinafter referred to as "SC-PROM" 3 for controlling electronic scanning. This SC-PROM 3 is provided with a program for controlling the normal/interlaced scanning or the scanning angles of ultrasonic wave beams. Delay lines 4-0 to 4-(N-1) are each provided with a plurality of (an M number of) taps, from which signals denoting different delay times are issued. The ultrasonic diagnosing apparatus further comprises analogue switches 5-0 to 5-(N-1). The analogue switches carry out the changeover of the taps of the delay lines 4-0 to 4-(N-1). Delay time control programable read only memories (hereinafter referred to as "DT-PROM") 6-0 to 6-(N-1) control the operation of the analogue switches 5-0 to 5-(N-1) for the changeover of the taps of the delay lines 4. Transmitting-receiving circuits 7-0 to 7-(N-1) supply delayed pulses to transducers 8-0 to 8-(N-1) and also receive video signals transduced by the transducers 8. Switches 9-0 to 9-(N-1) and 10-0 to 10-(N-1) undertake the changeover of the transmission and reception modes. FIG. 1 shows the transmission mode. During the reception mode, video signals received by the transmitting-receiving circuit 7 pass through the switches 9 and delay lines 4 to an adder 11. This adder 11 produces video signals which are converted into Z signals (brightness modulation signals).

X-PROM 12 sends forth sweeping digital signals for the X axis in accordance with the program of the SC-PROM 3. Y-PROM 13 also issues sweeping digital signals for the Y axis in accordance with the program of the SC-PROM. Digital-to-analogue converters 14 and 15 (hereinafter referred to as "D/A converter") convert output signals from the X-PROM 12 and Y-PROM 13 into sweeping analogue signals for the X and Y axes. A display monitor 16, which is supplied with analogue sweeping signals for the X and Y axes, and video signals for the Z signals displays an image of an object scanned by ultrasonic wave beams. With the prior art ultrasonic diagnosing apparatus of FIG. 1, no attention has been paid to changes with time in the delay characteristic of the delay lines 4, analogue switches 5 and transmitting-receiving circuits 7 connected to the delay lines 5. The delay characteristic is subject to variation due to not only the quality deterioration for a long period of time but also the exchange or modification of, for example, a logic circuit.

It is accordingly the object of this invention to provide an apparatus for producing an image of an object scanned by ultrasonic wave beams, wherein the delay time of delay means is measured periodically or at a given point of time to correct the preset delay time of the delay means.

The apparatus of this invention comprises a plurality of electro-acoustic transducer means arranged in a prescribed pattern for irradiating ultrasonic wave beams toward an object under examination to convert ultrasonic wave beams reflected from the object to video signals; means coupled to the transducer means for delaying the reference signals from the reference signal generator and the video signals transduced by the transducer means; means for processing the video signals to display an image of the object under examination; means for measuring the amount of delay time provided by the delay means; a central processor unit (CPU) coupled to the reference signal generator, measuring means, the delay means and display means; and memory means coupled to the CPU. The memory means stores data on the amount of delay time provided by the delay means; the CPU controls the operation of the delay time-measuring means and the delay means to measure the amount of delay time of the delay means and also controls the memory means to change the data stored therein in response to the measured data for compensating the amount of delay time of the delay means in accordance with the changed data, thereby causing the electro-acoustic transducer means to irradiate ultrasonic wave beams in a prescribed direction.

This invention can be more fully understood from the following detailed description when taken in conjunction with the accompanying drawing, in which:

FIGS. 5A–5D illustrate in block diagram form the operation of the delay measuring feature of the present invention.

Figure 1:
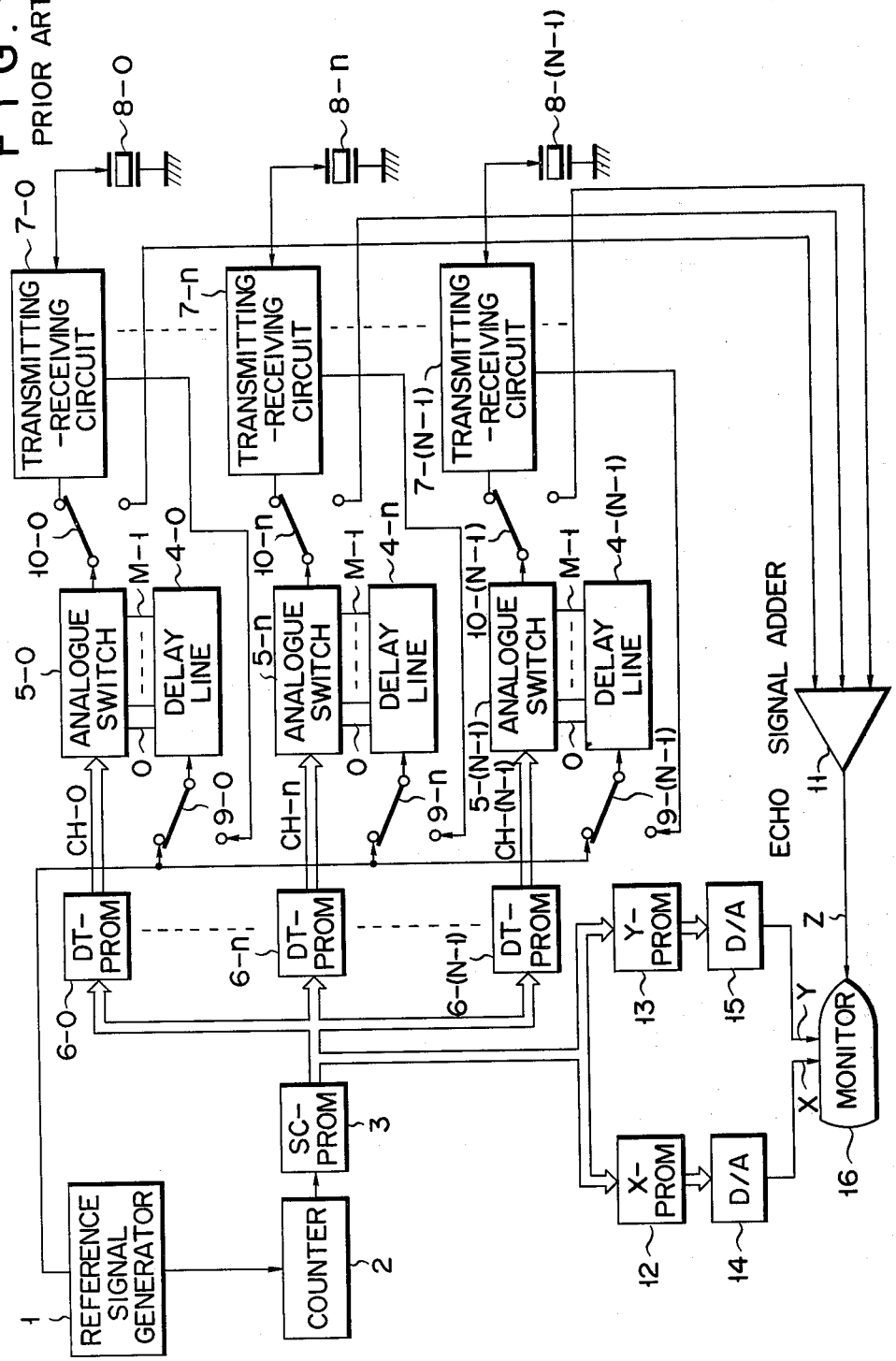
FIG. 1 is a block circuit diagram of the prior art ultrasonic diagnosing apparatus.
Figure 2:
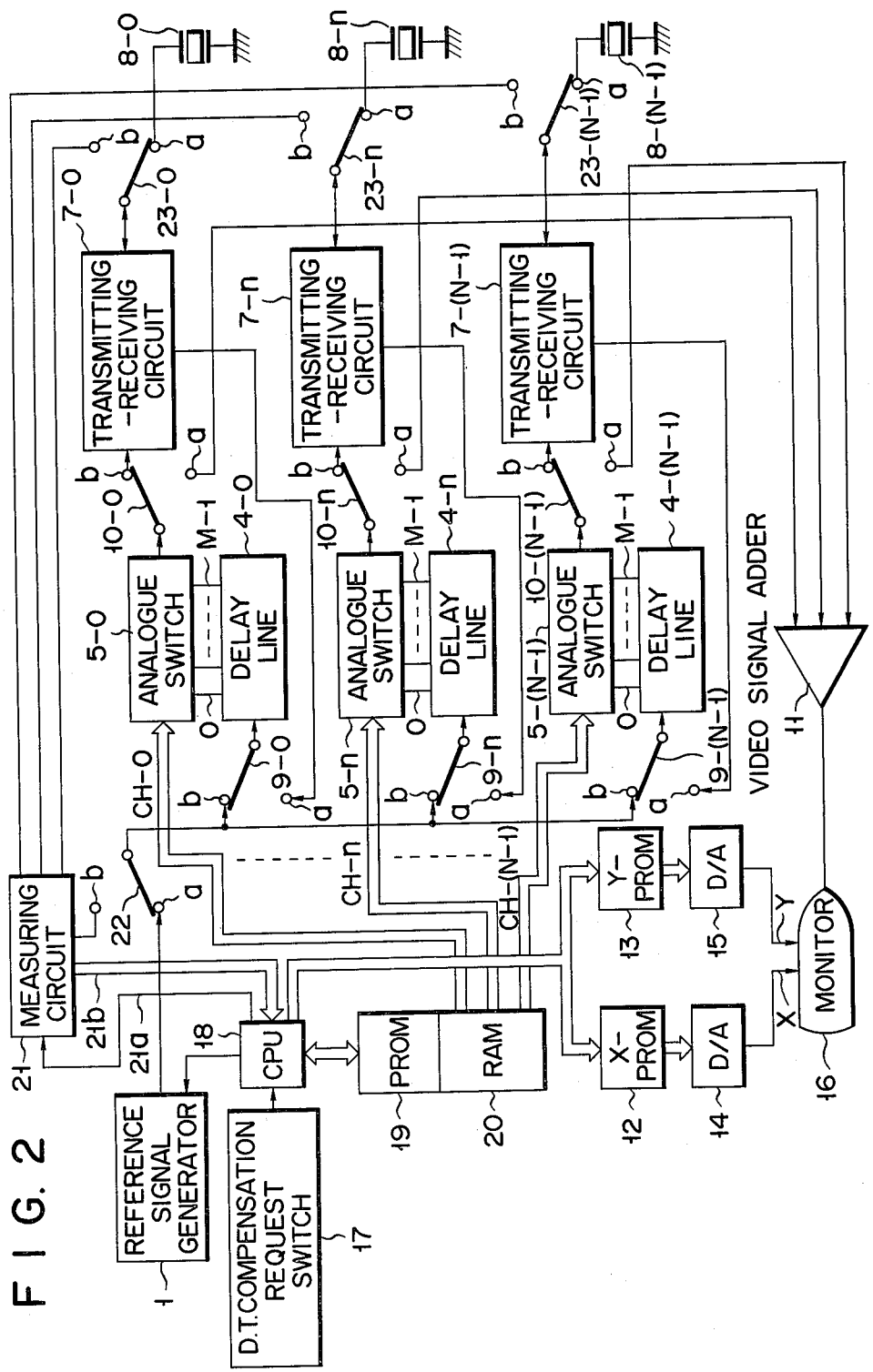
FIG. 2 is a block circuit diagram of an ultrasonic diagnosing apparatus embodying this invention.

FIG. 2 shows the arrangement of an ultrasonic diagnosing apparatus embodying this invention. The parts of FIG. 2 which are substantially the same as those of FIG. 1 are denoted by the same numerals, description thereof being omitted, unless particularly required. The present ultrasonic diagnosing apparatus comprises a microprocessor 18 (or central processor unit abbreviated as "CPU"). This microprocessor may be formed of the type IC 8080 manufactured by INTEL company of the United States. The CPU 18 is connected to the PROM (programable read only memory) 19 storing microinstructions. The PROM 19 may be formed of, for example, an MOS monolithic memory integrated circuit TMM 322c manufactured by TOSHIBA Corporation of Japan. The CPU 18 is also connected to a random access memory 20 (abbreviated as "RAM"). The RAM 20 may be formed of, for example, an MOS monolithic memory integrated circuit TMM 141c manufactured by TOSHIBA Corporation of Japan. The measuring circuit 21 may be formed of a sing-around circuit coupled to a frequency counter. The measuring circuit 21 will be detailed later by reference to FIG. 4. This measuring circuit 21 measures the delay time of a signal passing through a series circuit consisting of a transmitting-receiving circuit 7 and a delay time control device comprising the delay lines 4 and analogue switches 5. A movable contact of a changeover switch 22 is commonly connected to contacts b of changeover switches 9. The contact a of the switch 22 is connected to the output terminal of the reference signal generator 1. The contact b of the switch 22 is connected to one of the measuring terminals of the measuring circuit 21. The contacts a of the changeover switches 23-O to 23-(N-1) for the transmitting-receiving circuits 7-0 to 7-(N-1) are connected to the transducers 8-0 to 8-(N-1), and the contacts b of the changeover switches 23 are connected to the measuring circuit 21. Where the CPU 18 issues a measurement-starting instruction to the measuring circuit 21 through a control line 21a, then the movable contacts of the changeover switches 22 and 23 are selectively connected to the contacts b. As a result, the measuring circuit 21 begins to measure an amount of delay time provided by the circuits including the delay lines 4. A signal denoting the result of measurement is conducted to the CPU 18 through a data bus 21b. The X-PROM 12 and Y-PROM 13 are controlled by the CPU 18. The reference signal generator 1 issues a reference signal in a prescribed timing under control of a clock pulse used in the CPU 18. The subject ultrasonic diagnosing apparatus further comprises a switch 17 requesting the measurement of delay times defined by the delay circuits for compensation thereof, if necessary (hereinafter referred to as "a delay time compensation request switch"). A request can be made by operation of the switch 17 to the CPU 18 for a periodic or optional measurement of the delay times.

Figure 3:
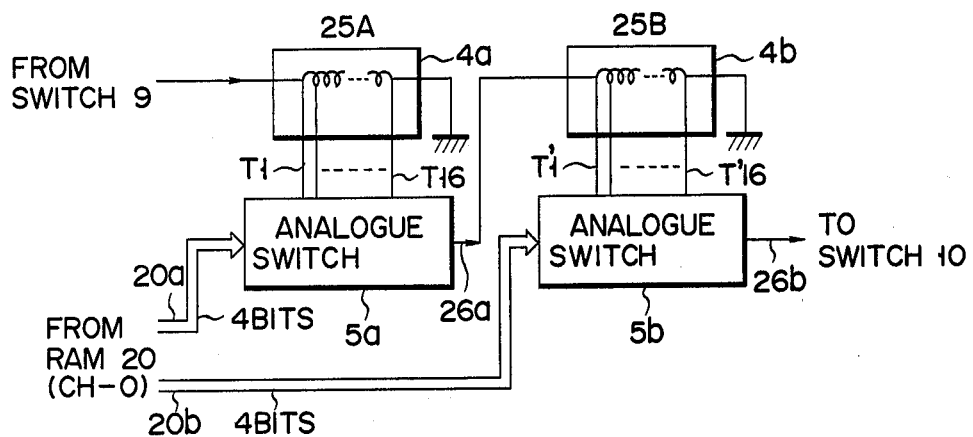
FIG. 3 shows the arrangement of the delay time control section of FIG. 2.

FIG. 3 shows the arrangement of delay time controller each including an analogue switch 5 and delay line 4. As seen from FIG. 3, the delay time controller is formed of first and second control units 25A, 25B connected in series. The first control unit 25A includes a delay line 4a and analogue switch 5a. The second control unit 25B includes a delay line 4b and analogue switch 5b. One of the terminals of the delay line 4a is selectively supplied with pulses from the reference signal generator 1 and transmitting-receiving circuit 7 through one of the changeover switches 9-0 to 9-(N-1). The other terminal of the delay line 4a is grounded. The delay line 4a is provided with, for example, sixteen taps T1 to T16, which are connected to the analogue switch 5a. Where the analogue switch 5a receives a 4-bit tap selection signal from the RAM 20 through a data bus 20a, then a tap selected in accordance with the contents of the selection signal is actuated to produce an output signal through a signal line 26a. This output signal is conducted to one of the terminals of the delay line 4b, the other terminal of which is grounded. The delay lines 4b is also provided with sixteen taps T1' to T16', which are connected to the analogue switch 5b. Where the analogue switch 5b receives a 4-bit tap-selecting signal from the RAM 20 through a data bus 20b, then a tap selected in accordance with the contents of the selection signal is operated to generate an output signal through a signal line 26b. This output signal is delivered to a changeover switch 10. The amount of delay time between the respective adjacent taps T1 to T16 of the delay line 4a is designed to be substantially equal to that of delay time between the taps T1' and T16' of the delay line 4b. The first control unit 25A roughly defines the lengths of delay time. The second control unit 25B carries out fine adjustment of delay time. Since the delay line 4a of the first control unit 25A and the delay line 4b of the second control unit 25B have sixteen taps alike, it is possible to obtain 256 different amounts of delay time.

Figure 4A:
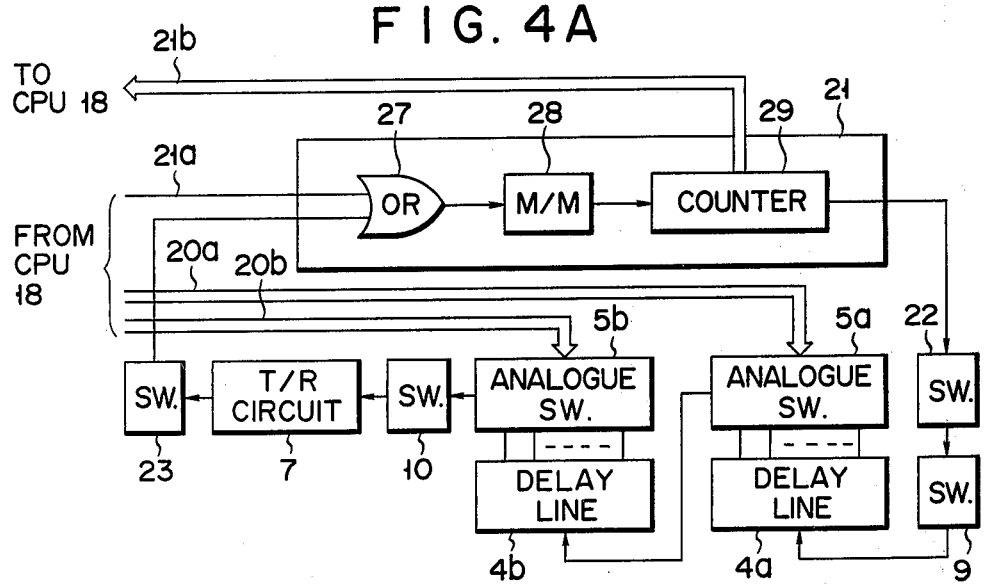
FIG. 4A is a block diagram of the measuring circuit of FIG. 2.
Figure 4B:
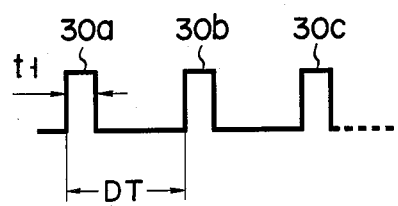
FIG. 4B shows pulses generated in the measuring circuit.

There will now be described by reference to FIGS. 4A and 4B the construction and operation of the measuring circuit 21. This measuring circuit 21 comprises an OR gate 27, monomultivibrator circuit 28, and counter 29. Where one of the input terminals of the OR gate 27 receives a start pulse from the CPU 18 through a control line 21a, then the monomultivibrator circuit 28 produces a first pulse 30a having a width t1 as shown in FIG. 4B. This first pulse 30a passes through the counter 29, third changeover switch 22, one of the first changeover switches 9, delay line 4a, analogue switch 5a, delay line 4b, analogue switch 5b, one of the second changeover switches 10, one of the transmitting-receiving circuits 7 and one of the fourth changeover switches 23, and is conducted to the other input terminal of the OR gate 27. As a result, the monomultivibrator circuit 28 issues a second pulse 30b of FIG. 4B. This second pulse 30b is carried through the same route as the first pulse 30a and is supplied to the other input terminal of the OR gate 27, causing the monomultivibrator circuit 28 to send forth a third pulse 30c. The counter 29 counts pulses 30a, 30b, 30c, . . . issued during a unit period of time. A number of the counted pulses is delivered to the CPU 18 through the data bus 21b. A time interval DT between the first and second pulses 30a and 30b denotes a measured length of delay time. With f taken to denote a number of pulses counted by the counter 29 during a unit period of time, then there results DT = 1/f There will now be described the operation, as illustrated in FIGS. 5A–5D, of an ultrasonic diagnosing apparatus of FIG. 2 embodying this invention. Where the previously defined "delay time compensation request switch" 17 is operated, then the CPU 18 judges whether the request is for a periodic or optional measurement of delay time, and causes a microinstruction on the measurement mode to be read out of the PROM 19 in accordance with the result of the judgement. Where the request is for a periodic measurement of delay time, then a timer provided in the CPU 18 is so set as to meet the request. The measuring circuit 21 is operated, each time an output signal is supplied from the timer in which a point of time is preset for the periodic measurement of delay time. At the time of measurement, the movable contacts of the first to the fourth changeover switches 9, 10, 22, 23 are connected to the corresponding contacts b. Where the CPU 18 issues an instruction (a start pulse) for commencement of measurement to the measuring circuit 21 through the control line 21a, then an amount of delay time occurring in the initial channel (O-th channel) including the delay line 4-0 and transmitting-receiving circuit 7-0 begins to be measured. In this case, the CPU 18 causes a tap-changing data to be readout of the RAM 20 to the analogue switch 5-0 to carry out the changeover from O to (M-1) of the taps of the delay line 4-0 corresponding to the analogue switch 5-0. Measurement is made of an amount of delay time provided by the respective taps of said delay line 4-0. The measured data obtained from the counter 29 constitutes a frequency signal. The CPU 18 causes the measured data expressed in the form of frequency to be temporarily stored in the RAM 20. The CPU 20 reads out the measured data or frequency data from the RAM 20, and computes a reciprocal of the frequency data. The computed reciprocal is stored in the RAM 20. The measured data is processed to indicate an amount of delay time defined by the taps of the delay lines of the respective channels.

The CPU 18 calculates an amount of delay time in which pulses are supplied to the transducers. An amount T of delay time can be determined from the following formula:

$$T = \frac{Td\ max}{2}\left[\left(\frac{2l}{L-1}-1\right)\left(\frac{2n}{N-1}-1\right)+1\right] \quad (1)$$

where:
Td max = a maximum delay time
N = a number of transducers
n = a variable number from O to (N-1)
L = a number of scanning lines
l = a variable number from O to (L-1)

Obviously it is possible to put a term of a focusing coefficient into the above formula.

After the CPU 18 calculates according to the above formula an amount of delay time being added to pulses supplied to the transducers, data is produced to select that of the taps of a delay line which indicates such amount of delay time as is closest to the calculated amount of delay time. The data is stored in the RAM 20.

Data for selection of the taps of a delay line which provide amounts of delay time being added to pulses supplied to the transducers is stored in the RAM 20 as shown in the following table.

TABLE

| ADDRESS NO. IN THE RAM 20 | CONTENTS | CHANNEL NO. |
|---|---|---|
| ZERO | TAP SELECTION DATA FOR ZERO-TH SCANNING | |
| . | . | |
| . | . | |
| l | TAP SELECTION DATA FOR l-TH SCANNING | 0 |
| . | . | |
| . | . | |
| L - 1 | TAP SELECTION DATA FOR (L-1)-TH SCANNING | |
| L | TAP SELECTION DATA FOR ZERO-TH SCANNING | |
| . | . | |
| . | . | |
| L + l | TAP SELECTION DATA FOR l-TH SCANNING | 1 |
| . | . | |
| . | . | |
| L + (L-1) | TAP SELECTION DATA FOR (L-1)-TH SCANNING | |
| . | . | |
| . | . | |
| (N-1)L | TAP SELECTION DATA FOR ZERO-TH SCANNING | |
| . | . | |
| . | . | |
| (N-1)L + l | TAP SELECTION DATA FOR l-TH SCANNING | N-1 |
| . | . | |
| . | . | |
| (N-1)L + (L-1) | TAP SELECTION DATA FOR (L-1)-TH SCANNING | |

Where the tap selection data shown in the above table is stored in the respective addresses of the RAM 20, then the CPU 18 causes the movable contacts of the third and fourth changeover switches 22, 23 to be connected to the corresponding contacts a in order to effect the routine mode operation of the ultrasonic diagnosing apparatus. During the routine mode operation, the analogue switches 5 select the taps of the delay lines 4. As a result, a reference signal issued from the reference signal generator 1, that is, a pulse for generation of ultrasonic wave beams is supplied to the delay lines 4 through the first changeover switches 9. The delay lines 4 provide prescribed amounts of delay time to the pulses with these amounts of delay time supplied to the transducers 8 through the analogue switches 5, second changeover switches 10, and transmitting-receiving circuits 23. In this case, tap selection data for zero-th scanning of all channels are used for the zero-th scanning line. Thus, a reference pulse issued from the reference signal generator 1 is delayed for an amount of time substantially equal to that expressed by the formula (1), and then supplied to a corresponding transducer. Thus the transducer array sends forth an ultrasonic wave beam for the zero-th scanning toward an object under examination. Ultrasonic wave beams reflected from the object are transduced into video signals by the transducer array. These video signals pass through the fourth changeover switches 23, transmitting-receiving circuits 7, first changeover switches 9, delay lines 4, analogue switches 5 and second changeover switches 10 and are supplied to the video signal adder 11. At this time, the video signals are supplied with the same amounts of delay time as the transmitted signals. Thereafter, the address of the RAM 20 is counted up by 1 to specify the first scanning line. Later, the address of the RAM 20 is counted up by 1 each time, until the (L-1)th scanning line is specified. Where the above-mentioned scanning operations for zero-th to (L-1)th scanning lines are brought to an end, the first scanning cycle of a foreground object is finished. Repetition of the above-mentioned scanning cycles displays a B-mode image of the foreground object on the monitor 16.

Where, according to this invention, the measuring circuit 21 is operated periodically or at a desired point of time, then transducer array-driving pulses are always supplied with accurate amounts of delay time. Even if, therefore, changes with time or unexpected variations take place not only in the delay lines of the ultrasonic diagnosing apparatus of this invention, but also in any other element thereof, a B-mode image of a foreground object is always produced in an accurate form, because any change in delay time of the elements can be compensated.

This invention is not limited to the foregoing embodiment. For example, the delay line may be replaced by an acoustic surface wave device. Further, the invention is also applicable to an apparatus for searching for scars or defects occurring in the interior of an object under examination.

What is claimed is:

1. In an apparatus for producing an image of an object scanned by ultrasonic wave beams and comprising a plurality of electro-acoustic transducer means arranged in a prescribed manner for irradiating ultrasonic wave beams toward an object under examination and for converting ultrasonic waves reflected from the object into corresponding video signals, means for generating reference signals for activating said transducer means, means for processing video signals to display an image of the object under examination, and means for delaying for one of a plurality of selectable time delay periods the transfer of said reference signals to said transducer and the transfer of said video signals to said processing means, means for calibrating the time durations of said selectable time delay periods comprising:

memory means for selectively storing in associated memory locations a reference delay value corresponding to the duration of each said selectable time delay periods;

means for measuring the actual time delay periods provided by said delaying means; and central processor means coupled to said memory means and said measuring means for (1) converting said measurements of said actual time delay periods into corresponding comparison values, (2) determining an ideal time delay value corresponding to each of said selectable time delay periods, (3) comparing a said ideal time delay value to each of said comparison values, (4) storing said comparison value most nearly equal to a said compared ideal time delay value into said memory location associated with the time delay period corresponding to said compared value whereby said memory locations store reference values corresponding to the actual time delay periods provided by said delaying means.

2. The calibrating means of claim 1 wherein said central processor means controls the selection of a time delay period to be provided by said delaying means by accessing first and second reference time delay values stored in said memory means and by transferring said accessed reference values to said delaying means and wherein said delaying means comprises:

a first delay control unit having a first delay line including (1) an input terminal for receiving a said generated reference signal, (2) a plurality of selectable first delay taps, each said first delay tap for delaying the transfer of a said received reference signal to a said electro-acoustic transducer means for a said time delay period corresponding to one of said reference values stored in said memory means, and (3) a first switch for selecting a said first delay tap in accordance with said first accessed reference value transferred by said central processor means and for generating an output signal corresponding to a said received generated reference signal delayed by said selected first delay tap; and a second delay control unit having a second delay line including (1) an input terminal for receiving said output signal of said first switch, (2) a plurality of selectable second delay taps, each said second delay tap for delaying the transfer of a said received output signal to a said electro-acoustic transducer means for a said time delay period corresponding to one of said reference values stored in said memory means, and (3) a second switch for selecting a said second delay tap in accordance with said second accessed reference value transferred by said central processor means and for generating a second output signal corresponding to said received first output signal delayed by said selected second delay tap.

3. The calibrating means of claim 1 wherein said central processor means controls the selection of the time delay period to be provided by said delaying means by accessing a reference time delay value stored in said memory means and by transferring said accessed reference time delay value to said delaying means, wherein said delaying means operates in a first mode for delayingly transferring said reference signals from said generating means to said transducer means and a second mode for delayingly transferring said video signals from said delaying means wherein said delaying means comprises:

a delay line having (1) a signal input terminal, (2) a signal output terminal, (3) a plurality of selectable delay taps, each said delay tap for delaying the transfer of a said signal from said signal input terminal to said signal output terminal for a said time delay period corresponding to one of said reference values stored in said memory means;

an analogue switch for receiving a said accessed reference value transferred by said central processor means and for selecting a said delay tap corresponding to said received reference value;
a transmitting-receiving circuit coupled to said transducer means, said transmitting-receiving circuit having a signal input terminal and a signal output terminal;
a first changeover switch for coupling said generating means to said signal input terminal of said delay line responsive to said delaying means operating in said first mode and for coupling said processing means to said signal output terminal of said delay line responsive to said delaying means operating in said second mode;
a second changeover switch for coupling said signal output terminal of said delay line to said signal input terminal of said transmitting-receiving circuit responsive to said delaying means operating in said first mode and for coupling said signal output terminal of said delay line responsive to said delaying means operating in said second mode whereby when said delaying means operates in said first mode said reference signals are transferred in a selectively delayed manner from said generating means to said transducer means and when said delaying means operates in said second mode said video signals are transferred in a selectively delayed manner from said transducer means to said processing means.

4. The calibrating means of claim 1 wherein said delaying means includes a signal input terminal and a signal output terminal and wherein said measuring means comprises:
means for generating a measurement-initiating pulse;
an OR gate having a first signal input terminal for receiving said measurement-initiating signal, a second signal input terminal coupled to the signal output terminal of said delaying means, and a signal output terminal;
a monomultivibrator coupled to said signal output terminal of said OR gate for generating a counting pulse for each output signal received from said OR gate;
a counter for (1) receiving and counting said counting pulses generated by said monomultivibrator, (2) storing said count of said received counting pulses, (3) transferring said received counting pulses to said signal input terminal of said delaying means, and (4) selectively transferring said stored count to said central processor means.

* * * * *